H. H. CRAWFORD.
VALVE FOR GAS ENGINES.
APPLICATION FILED JUNE 25, 1920.
1,406,979.
Patented Feb. 21, 1922.
2 SHEETS—SHEET 1.
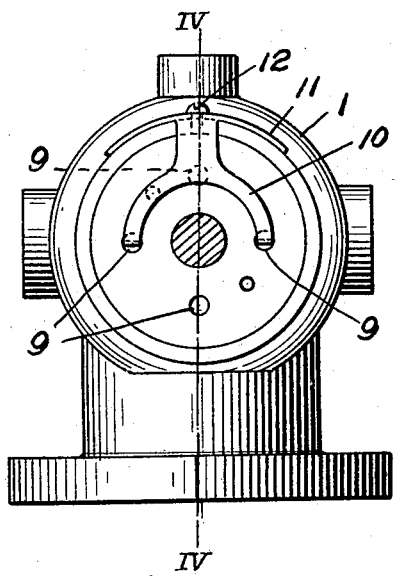
FIG. I.
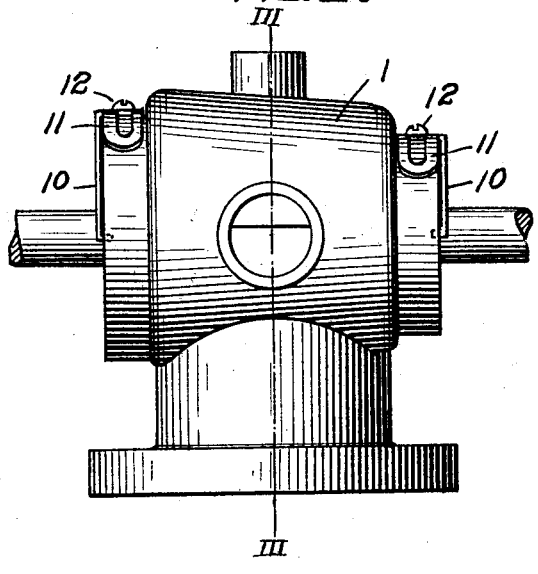
FIG. II.
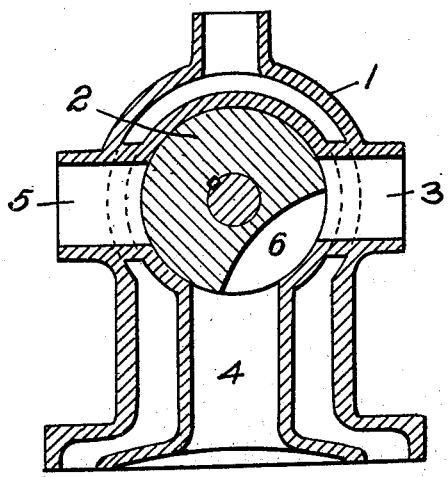
FIG. III.
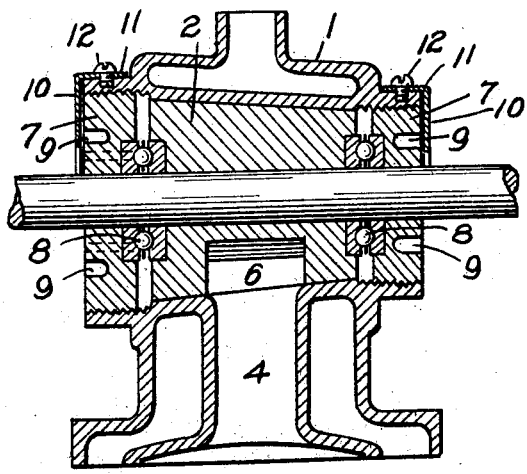
FIG. IV.
WITNESSES
J. Herbert Bradley
Francis J. Tomasson
INVENTOR
Harry H. Crawford
by Christy and Christy
his attorneys H. H. CRAWFORD.
VALVE FOR GAS ENGINES.
APPLICATION FILED JUNE 25, 1920.
1,406,979.
Patented Feb. 21, 1922.
2 SHEETS—SHEET 2.
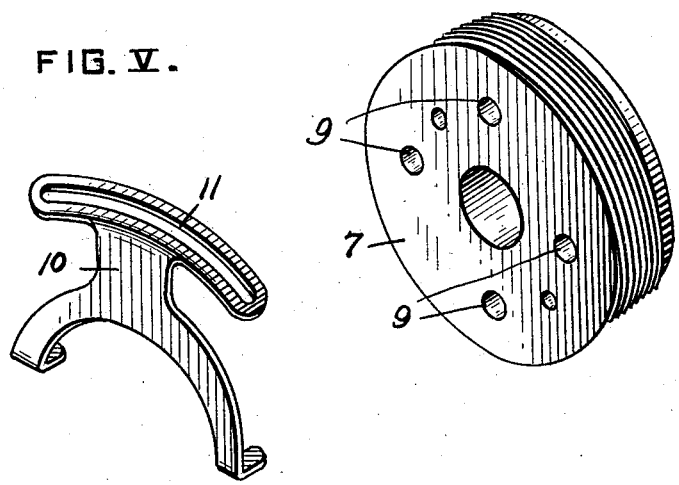
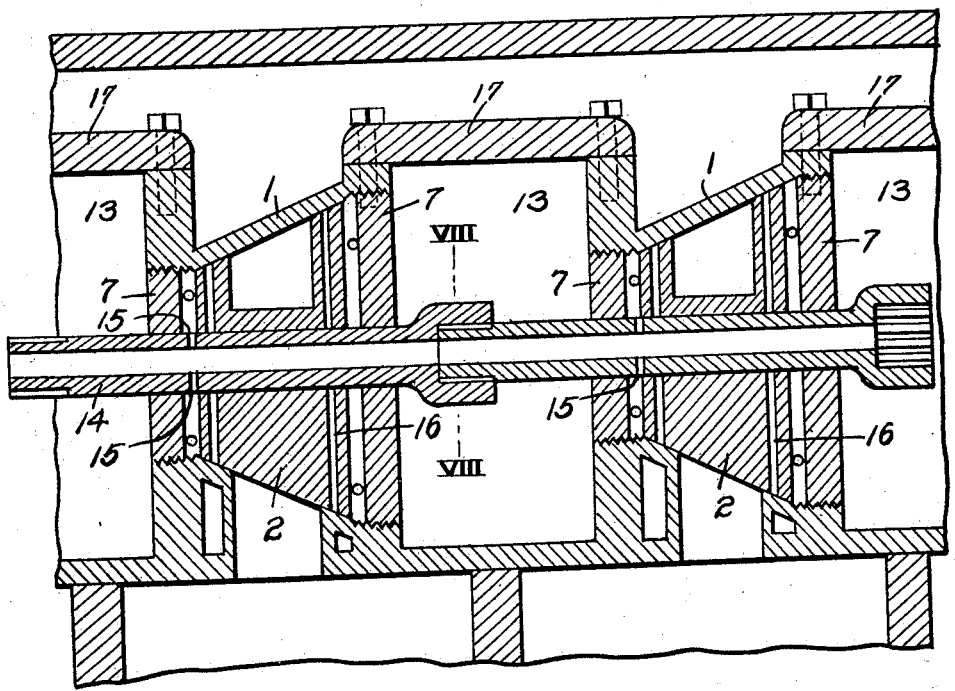
WITNESSES
INVENTOR
Harry H. Crawford
by Christy and Christy
his attorneys

UNITED STATES PATENT OFFICE.

HARRY H. CRAWFORD, OF WELLSBURG, WEST VIRGINIA.

VALVE FOR GAS ENGINES.

1,406,979.  Specification of Letters Patent.  Patented Feb. 21, 1922.

Application filed June 25, 1920. Serial No. 391,634.

*To all whom it may concern:*

Be it known that I, HARRY H. CRAWFORD, residing at Wellsburg, in the county of Brooke and State of West Virginia, a citizen of the United States, have invented or discovered certain new and useful Improvements in Valves for Gas Engines, of which improvements the following is a specification.

My invention relates to improvements in valves for gas engines, and particularly to those of rotary type. It is illustrated in the accompanying drawings. Fig. I is a view in end elevation of the valve chest; Fig. II is a view in side elevation of the same structure; Figs. III and IV are views in vertical section, the planes of section being indicated by the lines III—III Fig. II and IV—IV, Fig. I, respectively. Fig. V is a view in perspective and to larger scale of the device for securing in position the follower plates which form the end walls of the valve chest; Fig. VI is a like view of one such follower plate. Fig. VII shows the invention applied to a plurality of engine cylinders; and Fig. VIII is a view in section of a detail, on the line VIII—VIII, Fig. VII.

Within the valve chest 1 (preferably water-cooled, as shown) is formed a seat for a conical rotary valve 2. The chest is provided with suitable passageways: induction passageway 3, passageway 4 communicating with the cylinder, and exhaust passageway 5; and the valve body 2 is provided with a recess 6 of such proportions as to bring about, as the valve rotates, the proper sequence of connections for gaseous flow through the valve, each connection being maintained for the proper interval of time. In this respect there is nothing of novelty in my valve, and I note these features merely by way of identification. The structure is adapted as shown to be secured upon the head of the cylinder of an internal combustion engine.

The advantage of a conical valve is that, as it wears, it may be moved in axial direction within its chest and the desired closeness of fit maintained. Thus correction is possible, to prevent leakage otherwise incident to wear. To this end the valve is carried between thrust plates or follower plates 7, which also constitute the heads of the valve chest. Between valve body and follower plates are advantageously introduced the ball bearings 8.

The follower plates 7 are screw threaded into the adjacent valve-chest wall, and, according as they are adjusted, the valve body within is moved. Externally each follower plate is provided with a pair and preferably with a plurality of pairs of recesses 9; the recesses of each pair are conveniently arranged diametrically opposite one another and the pairs are remote, pair from pair, a sufficient angular distance; in this instance 90°. Into the recesses of one or another pair opposite prongs of a spanner plate 10 may be introduced, and the spanner plate itself secured to the body of the valve chest. This engagement of spanner plate to valve chest is separable and adjustable, as by means of the slotted portion 11 and set screw 12, to the end that (coordinated with the re-duplication of pairs of recesses 9) the follower plate may be secured in any position to which it may be brought, to the minutest fraction of a revolution.

Fig. VII shows the valve applied in an engine including a plurality of cylinders. As in the structure of Figs. I–IV, the individual valve chests are closed at either end with follower plates 7 screw-threaded into the valve-chest wall, and these plates may be secured at any point in their range of turning by means such as those already described.

My further invention in this regard relates itself to the removal of the valves individually. It not infrequently happens that one of such a succession of valves requires to be removed. With the forms of apparatus hitherto proposed it is necessary to take the whole valve assembly apart to gain access to any one valve. My invention makes possible the removal and replacement of any one valve in the series, without the necessity of removing all.

The valves 2 of the series within their valve chests 1 are aligned, with spaces 13 between the valve chests. These spaces 13, conveniently enclosed, are still accessible by the provision of removable cover plates 17. The valve stem 14 is formed of a series of sections connected one to another by the splined ferrule joint fully illustrated in Figures VII and VIII. Valve and valve stem are splined for relative longitudinal movement (as is also the case in Figures I–IV). The sections of the valve stem conveniently correspond in number to the number of individual valves. The ferrule connections are then arranged in the spaces 13 between the valve chests 1. This connection, it will be observed, permits of facility of separation section from section longitudinally, but insures rotation as a unit of the sections when connected together. The valve stem 14 is conveniently hollow, as shown, and from the hollow within the stem, ports 15 open into each of the valve chests when the parts are assembled. Oil ducts 16 extend through the valve body. Through this hollow shaft, oil may be pumped for lubricating the individual valves, and such being the case, the spaces 13 constitute wells in which escaping oil will collect.

When any one valve of such a series is to be removed, the shaft is separated at the joint immediately to the right (Figure VII) of that particular valve, and the right-hand portion of the separated stem is withdrawn from that particular space 13; the cover plates 17 of the spaces 13 on either side of the valve are removed; the follower plates 7 on either side of the valve to be removed are then unscrewed from engagement with the valve chest; the then liberated valve, together with its section of stem and with the larger and right-hand follower plate 7, may then be withdrawn through the space 13 on the right. Replacement may of course be made in reverse sequence.

In the ensuing claims I define that which is of the essence of my invention. Beyond this, modifications in structure are manifestly admissible.

I claim as my invention:

1. In a valve structure a rotary conical valve body and a chest therefor; the said chest provided with a head screw-threaded into the chest wall, a locking member for said head movable with said head, and means for securing said member to said wall at any point within a given range of movement, substantially as described.

2. In a valve structure a rotary conical valve body and a chest therefor, the said chest provided with a head screw-threaded into the chest wall, a pair of recesses in said head, a spanner plate adapted to engage said recesses, and means for securing spanner plate to chest wall at any point within a given range of turning of said head, substantially as described.

3. In a valve structure a plurality of conical valves splined for longitudinal movement to a common sectional stem and contained each within a valve chest, the said valve chests being provided each with opposite independently rotatable adjustable heads, and with means for securing the heads against rotation at any point in their range of turning, such means including a member engaging the valve-chest head and a securing device adapted to secure the member last named to the valve-chest wall at any point throughout a given range of turning of the head, substantially as described.

4. In a valve structure a plurality of valves splined for relative longitudinal movement to a common sectional longitudinally separable stem and contained each within a valve chest with spaces between, each valve chest being provided with a removable head, whereby any valve of the series may be removed through an adjacent inter-chest space, substantially as described.

5. In a valve structure, a plurality of valve chests with aligned rotary valves arranged within and spaced apart one from another with wells between, a hollow stem common to the plurality of valves and ducts opening through the walls of the hollow stem, and when the parts are assembled opening within the valve chests, substantially as described.

6. In a valve structure, a valve chest, a valve body adapted to be rotated within said chest and in contact with the walls thereof and provided with an axial opening for a stem, a valve stem within the opening in said valve body sustaining said valve body and splined to said valve body, stem and valve possessing relative longitudinal movement, said valve stem being hollow and provided with an orifice through its wall which when the parts are assembled opens within the valve chest, and a duct extending through the valve body from the axial stem-receiving opening to the outer chest-engaging periphery, substantially as described.

In testimony whereof I have hereunto set my hand.

HARRY H. CRAWFORD.

Witnesses:
C. B. MAGEE,
JEANNETTE McMAHAN.